US009065290B2

(12) United States Patent
Taddeo

(10) Patent No.: US 9,065,290 B2
(45) Date of Patent: Jun. 23, 2015

(54) THREE PHASE INVERTER DRIVER

(75) Inventor: Stephen R. Taddeo, Long Beach, CA (US)

(73) Assignee: Green Charge Networks LLC, Santa Clara, CA (US)

( * ) Notice: Subject to any disclaimer, the term of this patent is extended or adjusted under 35 U.S.C. 154(b) by 755 days.

(21) Appl. No.: 13/314,090

(22) Filed: Dec. 7, 2011

(65) Prior Publication Data

US 2013/0147264 A1    Jun. 13, 2013

(51) Int. Cl.
| | |
|---|---|
| *H02J 1/00* | (2006.01) |
| *H02J 3/00* | (2006.01) |
| *H02J 7/00* | (2006.01) |
| *H02M 7/30* | (2006.01) |
| *H02M 7/00* | (2006.01) |
| *B60L 1/00* | (2006.01) |
| *H02M 1/12* | (2006.01) |
| *B60L 11/18* | (2006.01) |
| *B60L 11/00* | (2006.01) |

(52) U.S. Cl.
CPC ............ *H02J 7/0065* (2013.01); *Y10T 307/707* (2015.04); *H02M 7/30* (2013.01); *H02M 7/00* (2013.01); *B60L 1/00* (2013.01); *H02M 1/12* (2013.01); *H02J 3/00* (2013.01); *Y02T 10/7241* (2013.01); *Y02T 90/14* (2013.01); *B60L 1/006* (2013.01); *B60L 11/1812* (2013.01); *B60L 11/185* (2013.01); *B60L 11/1881* (2013.01); *B60L 2210/44* (2013.01); *B60L 2240/527* (2013.01); *B60L 11/005* (2013.01); *B60L 11/1803* (2013.01); *B60L 2210/20* (2013.01); *Y02T 10/7022* (2013.01); *Y02T 10/725* (2013.01); *Y02T 90/34* (2013.01); *Y02T 90/128* (2013.01); *Y02T 90/127* (2013.01); *Y02T 90/121* (2013.01)

(58) Field of Classification Search
CPC .......... H02J 7/0065; H02M 7/30; H02M 7/00
USPC ...................................... 307/9.1, 82
See application file for complete search history.

(56) References Cited

U.S. PATENT DOCUMENTS

| 6,510,063 | B2 * | 1/2003 | Kobayashi et al. | ............. 363/41 |
| 2011/0198936 | A1 * | 8/2011 | Graovac et al. | ................. 307/82 |

* cited by examiner

*Primary Examiner* — Carlos Amaya
(74) *Attorney, Agent, or Firm* — Richard C. Galati; Holland & Hart LLP

(57) ABSTRACT

A system and method of use of a three-phase inverter driver includes three single-phase inverters that are connected to the three-phase AC input of electric vehicle supply equipment (EVSE) so that each of the single-phase inverters provide one of the three phases of the AC signal used by the EVSE. The single-phase inverters are rectified and either have variance in their output frequencies or have their phases staggered so that the maximum voltage provided to the EVSE remains at a consistently high level. In some cases, the three phases each cross polarity simultaneously, resulting in a drop in the maximum three-phase voltage, so low-capacity capacitors are used in conjunction with the inverters to bridge these gaps in voltage. These systems and methods use readily available, inexpensive components that have regulatory safety-approval and therefore may allow implementation on a vehicle or with a load leveling energy storage system.

22 Claims, 6 Drawing Sheets

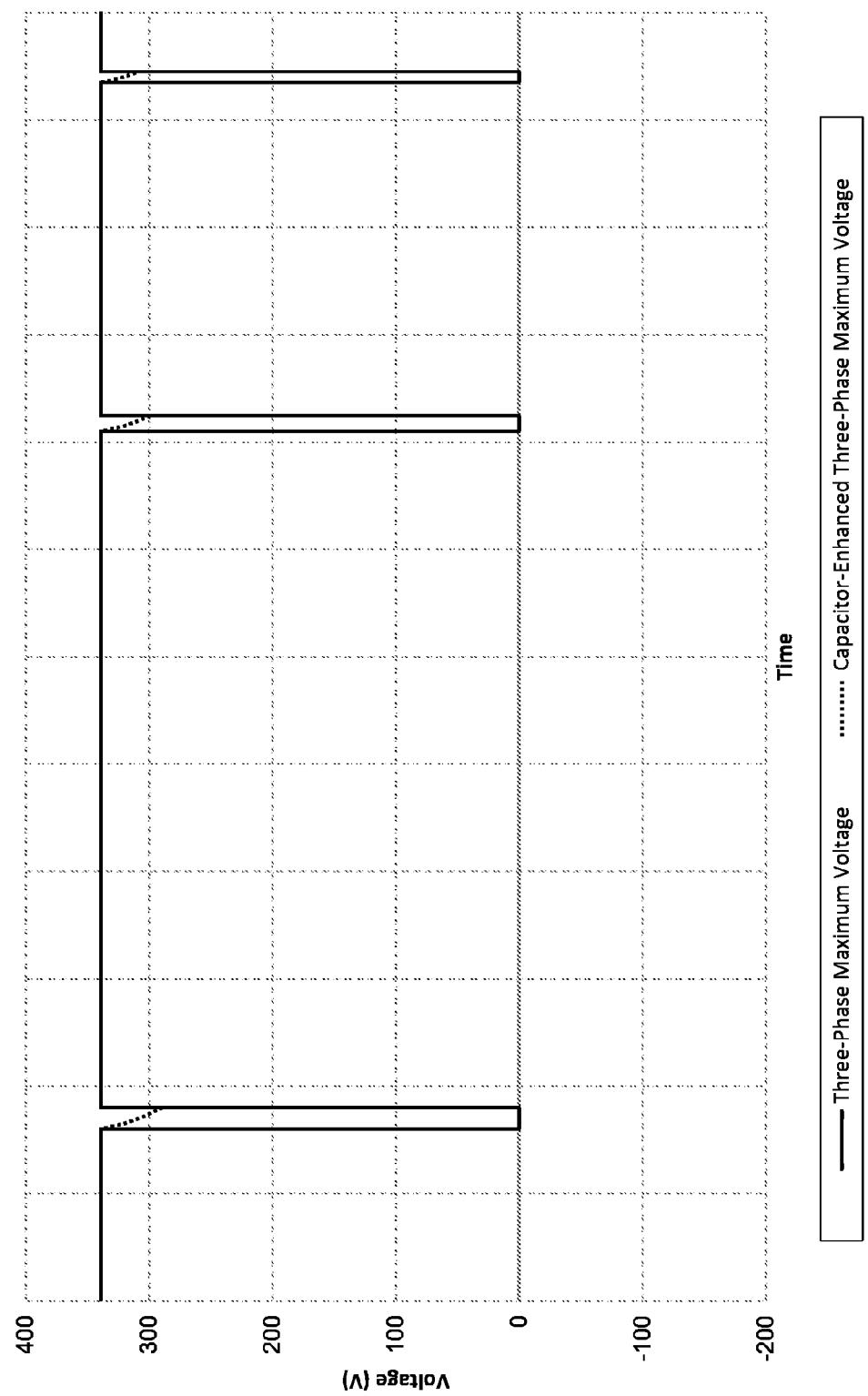

THREE PHASE INVERTER DRIVER

CROSS-REFERENCE TO RELATED APPLICATIONS

Not applicable.

BACKGROUND

The present invention is directed to the fields of power converters, inverters, electric vehicle charging equipment, and related fields.

Due to the rising popularity of electric vehicles (EVs) on the market today, demand for high power electrical grid connections has greatly increased due to a need for high power EV charging stations. Desirable charging rates of high capacity electric vehicle batteries require high power levels that are not available from typical household electrical systems. As such, electrical connections that can provide high voltage AC or DC "Level 2" or "Level 3" Electric Vehicle Service Equipment (EVSE) are important to the growth of the electric vehicle service industry.

In some cases, an EVSE may rely on batteries to provide the energy needed for EV charging. This is especially useful in applications where the EV is charged by a mobile or portable energy storage device or in applications where use of the EVSE would lead to excessive utility demand charges. However, problems may arise when sourcing safety-certified charging equipment to work with these batteries and other energy storage devices, as most inexpensive commercially-available EVSEs require high voltage three-phase AC power to run from. Energy storage devices such as lithium-ion batteries do not innately provide this power form and thus require that EVSE be connected to the energy storage devices through DC-to-AC power converters that bring the voltage output of the energy storage devices to a form suitable for the EVSE to charge a vehicle. Acquiring or building power converters for these energy storage devices that can perform these tasks safely and reliably is expensive and time consuming for many reasons, not the least of which is the need to obtain regulatory safety approval from organizations such as Underwriters Laboratories (UL). Powering an EVSE that requires three-phase 240-volt AC input is especially difficult because of the prohibitive cost of obtaining three-phase inverters on the market today and the prohibitive expenditure of time needed to gain safety approval from UL and other related entities.

BRIEF SUMMARY

Most available exemplary EVSEs require three-phase AC input at 208 volts. It is challenging to convert the energy storage output form into the required input form for the EVSE. Considering the state of the art, it would greatly benefit EVSE users that have DC energy storage devices to receive a power converter capable of bridging DC voltage sources to a three-phase AC form that is suitable for powering a fast-charging EVSE. Some existing "all-in-one" three-phase inverters can perform this conversion, but they are prohibitively expensive. Single-phase inverters are available at a much lower cost due to their applicability in a wider set of applications. Embodiments of the invention are directed toward a system using multiple inexpensive single-phase inverters to produce a three-phase AC output that is suitable for powering three-phase EVSEs from a DC input at a fraction of the cost of the all-in-one three-phase inverters. In addition to these cost savings, embodiments of the invention use inverters that already have desirable safety approvals, so additional independent safety approval is unnecessary.

Typical embodiments of the invention are directed toward a three phase inverter driver and power conversion system wherein three single-phase inverters (1) have input ports connected to a common DC source or bus connected thereto and (2) have output ports each driving one of the three phases of a three-phase signal. In some embodiments, the output of the single-phase inverters or EVSE passes through a rectifying means, which may be internal to the EVSE. In some embodiments the single-phase inverters have modified-sine AC output which includes short intervals of zero output voltage when changing output polarity simultaneously. In other embodiments their outputs are staggered, either due to slight variance in their operation, manufacturing tolerances, or by intentional timing staggering, to minimize or eliminate the chance that all three phases of the three-phase output of the inverters are changing polarity simultaneously. In some other embodiments, there is an inexpensive, long-lasting capacitor installed in the system to mitigate the drop in the maximum voltage of the three-phase signal during any brief intervals where all three of the inverters transition polarity concurrently. In embodiments where the single-phase inverters' timing is staggered, the AC outputs of the three inverters may be synchronized, then staggered by approximately 120 degrees (or one third of a period) to prevent simultaneous polarity crossing.

Additional and alternative features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments.

FIG. 6 is a voltage graph showing the maximum voltage of a rectified three-phase modified sine AC signal wherein all three phases cross polarity simultaneously from time to time, and the maximum voltage of the signal when a capacitor smoothing enhancement is added.

DETAILED DESCRIPTION

Typical embodiments of the invention are directed toward a three phase inverter driver and power conversion system.

Preferred embodiments of the system described herein may serve to improve the availability, accessibility, cost effectiveness, implementation, and operation of three-phase power converters and inverters, especially in the use of EVSE and fixed DC power sources.

Figure 1:
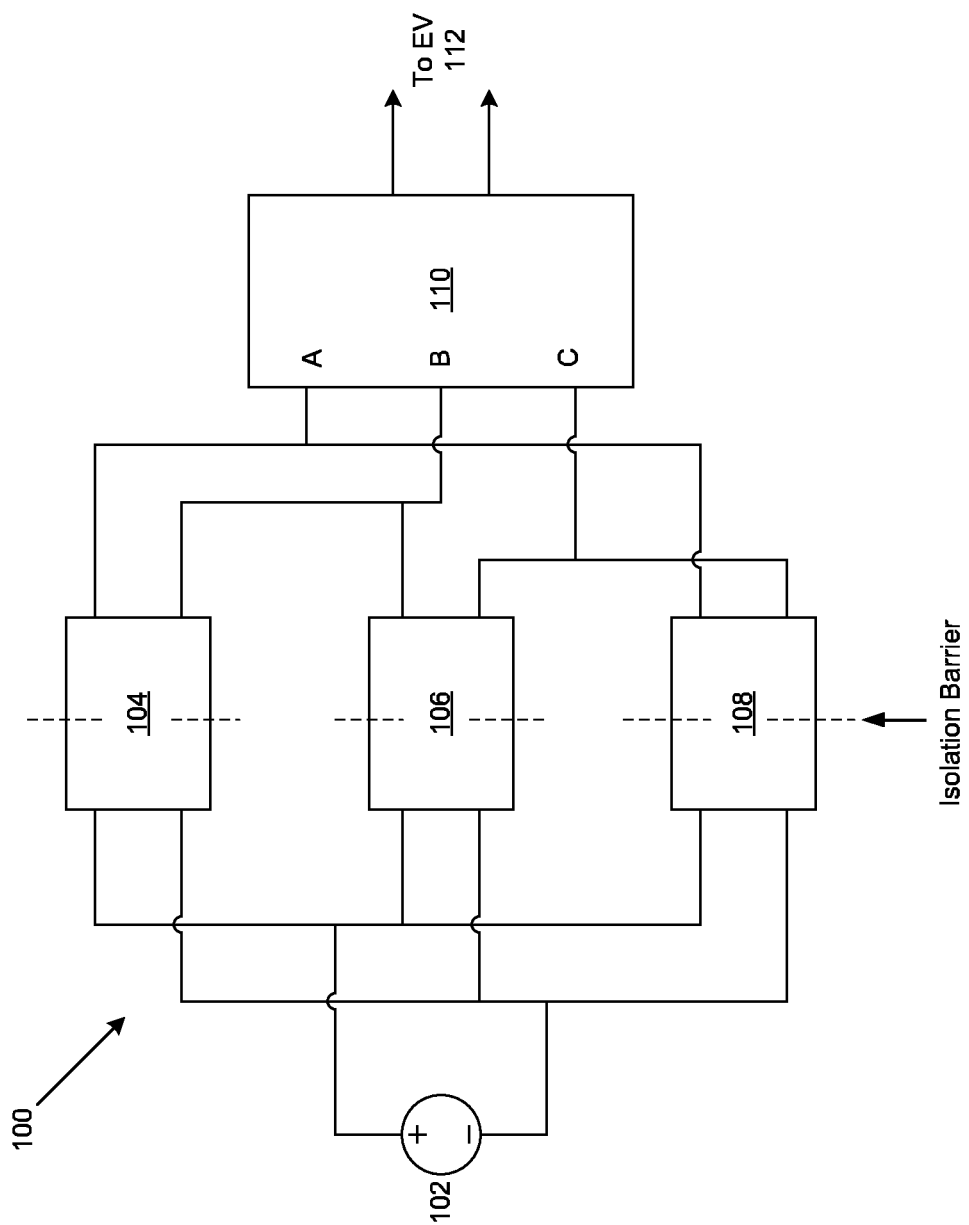
FIG. 1 is a circuit diagram of a system of an exemplary three-phase inverter driver and charging system.

FIG. 1 is a circuit diagram of an exemplary three phase inverter driver system. The conversion system 100 is comprised of an energy source 102 that is connected to three single-phase inverters 104, 106, and 108 that provide three phase inputs A, B, and C of the EVSE 110. The EVSE 110 output is connected to the EV 112 or another connected energy storage device such as a battery bank on a mobile EV charging system. The three single-phase inverters 104, 106, and 108 are connected to the energy source 102 in parallel in order to symmetrically provide energy to each of them.

The energy source 102 shown in this figure is a DC energy source. The single-phase inverters in this embodiment are adapted to convert DC to AC, but a single-phase AC source could also be used as the energy source 102 if the single-phase inverters were adapted to convert AC to AC, as indicated by the isolation barrier in FIG. 1.

In certain embodiments the single-phase inverters 104, 106, 108 are isolated 12-volt DC to 240-volt AC modified-sine inverters. Thus, in these embodiments, the energy source 102 provides a 12 volt DC signal to each single-phase inverter 104, 106, or 108, and the output to the EVSE 110 from each single-phase inverter is a single phase of modified sine 240-volt AC. These single phase 12 VDC to 240 VAC modified sine inverters are preferable in some embodiments because they follow a standard profile that is readily available on the market, thus they would not need independent safety approval like a custom-made inverter could require, and they are vastly less expensive to use, even in groups of three, when compared to all-in-one three-phase inverters since, due to economies of scale, their numbers equate to lower prices. It is noted, however, that these single-phase inverters are only one possible embodiment that may be used as inverters in the invention, and other embodiments may use single-phase inverters having alternative standardized or customized input or output profiles, output signal types, or other features when feasible. In real-world use, three single-phase inverters (e.g., 104, 106, and 108) will typically have slight differences in output frequency due to manufacturing tolerances or user settings. This means that the outputs of the three single-phase inverters 104, 106, and 108, will be staggered to some extent. After rectification, the outputs will form a three-phase waveform having a nearly uniform maximum voltage. The usefulness of this result is described in more detail later in this document.

The typically soft regulation curve of most commonly available inverters can mitigate load sharing imbalances between three parallel-connected inverters. The output voltage of these inverters typically sags enough when you put a load on it that any small differences in the initial voltage setpoint are therefore swamped out. Thus, in some embodiments of the invention the voltage setpoint of the three single-phase inverters 104, 106, and 108 divided by the load regulation is not allowed to exceed the maximum allowable amperage difference from one inverter's output to either of the others. The current sharing among the single-phase inverters 104, 106, and 108 should thus be roughly equivalent despite minor differences in their internal resistance and actual output voltage setpoints, limiting heat and load imbalances among the inverters 104, 106, and 108. Additionally, it is noted that small imbalances of these kinds are harmless.

The three-phase EVSE 110 receives three single-phase AC signals from outputs of the three single-phase inverters 104, 106, and 108 at input points A, B, and C. The topology shown in FIG. 1 allows the EVSE 110 to operate as if it were receiving an ordinary three-phase AC connection from a utility distribution grid or an all-in-one three-phase inverter. The EVSE 110 of these embodiments implements a bridge rectifier for its three phase input in order to keep the DC output to the EV 112 from switching polarity in an undesirable manner. The EVSE 110 of this embodiment would not use a form of active rectification which would require specific timing of the three phases, but in some embodiments where the outputs of the single-phase inverters 104, 106, and 108 have their timing or phases controlled, the timing requirement of the EVSE 110 would be taken into account.

In some embodiments, the EVSE 110 has its DC output smoothed by a capacitor or other energy storage device that is situated in parallel with the EVSE 110 output connections. Assuming the energy storage device is a capacitor, this capacitor may be used to reduce the impact of brief voltage drops when the polarities of all three single phases in the three phase signal simultaneously change. In preferable embodiments, this capacitor is small, such as, for example, a polypropylene capacitor, because simultaneous polarity changes would be brief and/or rare, so a larger, more expensive capacitor would not be necessary to keep the three-phase inverter output from falling to zero.

Figure 2:
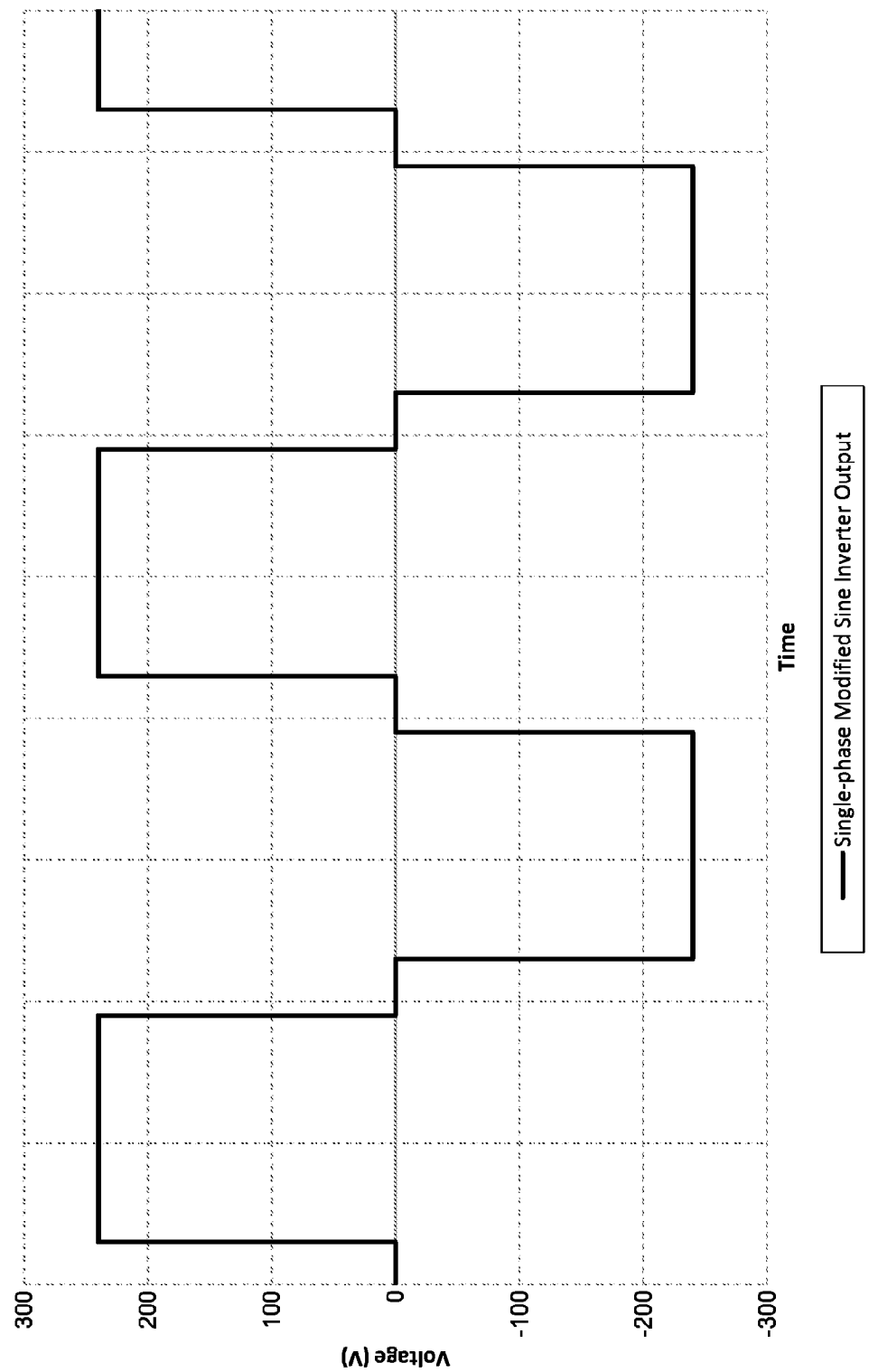
FIG. 2 is a voltage output graph showing an exemplary modified sine AC output from a lone single-phase inverter.
Figure 3:
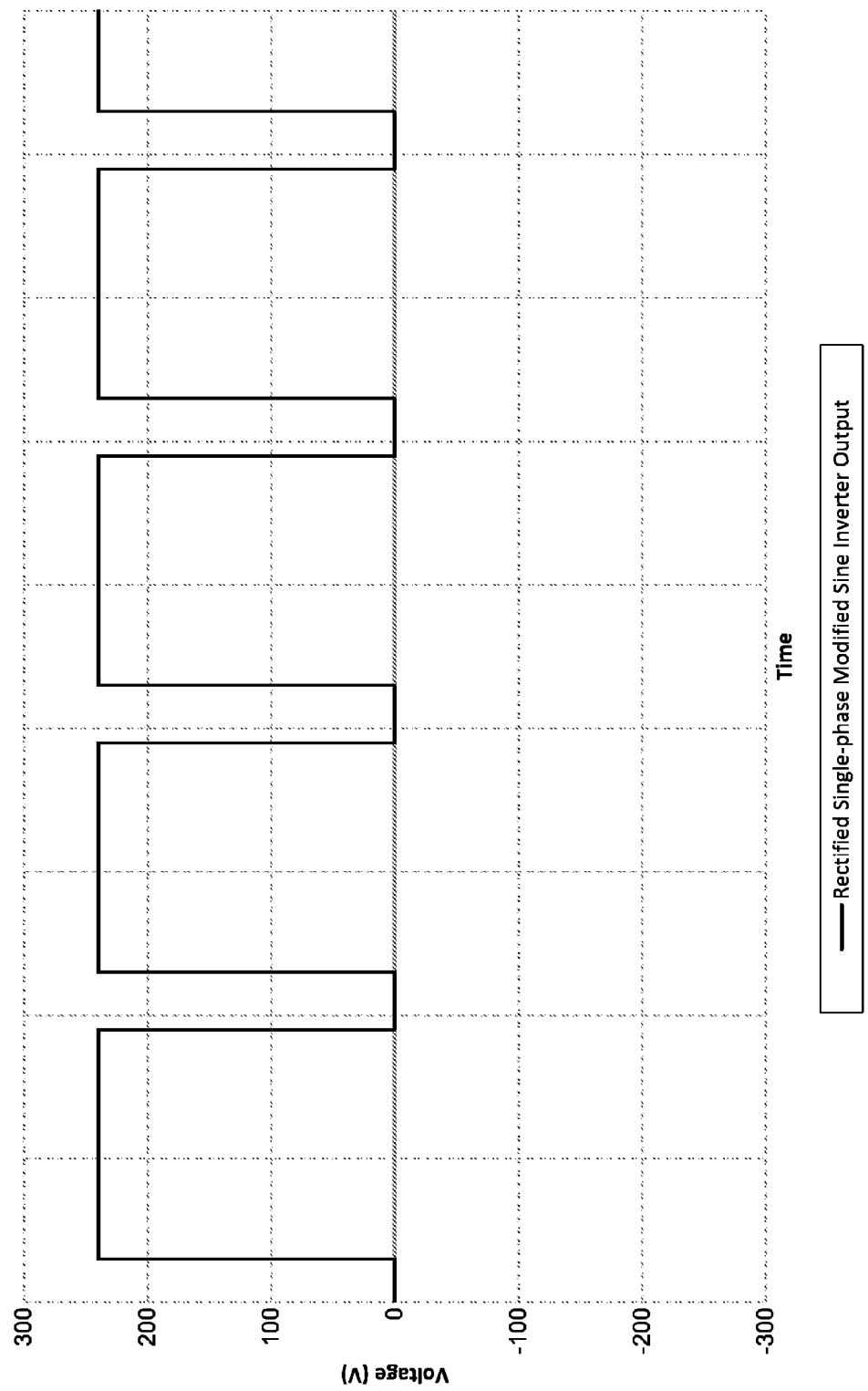
FIG. 3 is a voltage output graph showing an exemplary rectified modified sine AC output from a lone single-phase inverter.

FIG. 2 is a graph showing an exemplary modified sine AC output from a lone single-phase inverter. The voltage coming from the inverter alternates between a first zero voltage, a high voltage (in this case, 240 volts), a second zero voltage, and a low voltage (in this case, −240 volts) that then returns to the first zero voltage again. The period of the waveform is the length of time from the start of the first zero voltage to the time that the first zero voltage begins again. In this embodiment, the length of the zero voltage periods is one fourth of the length of the high or low voltage periods, but greater or lesser lengths of the zero voltage period may also be used. For example, the output frequency and voltage of the inverter producing the waveform of FIG. 2 may vary slightly from one inverter to another in some embodiments due to manufacturing tolerances or user input error. In some embodiments, such as those in which the EVSE rectifies its three-phase inputs, this is the signal that is received by the EVSE at each of those inputs. In some other embodiments, the signal is rectified before being provided to the EVSE, as shown in FIG. 3.

Figure 4:
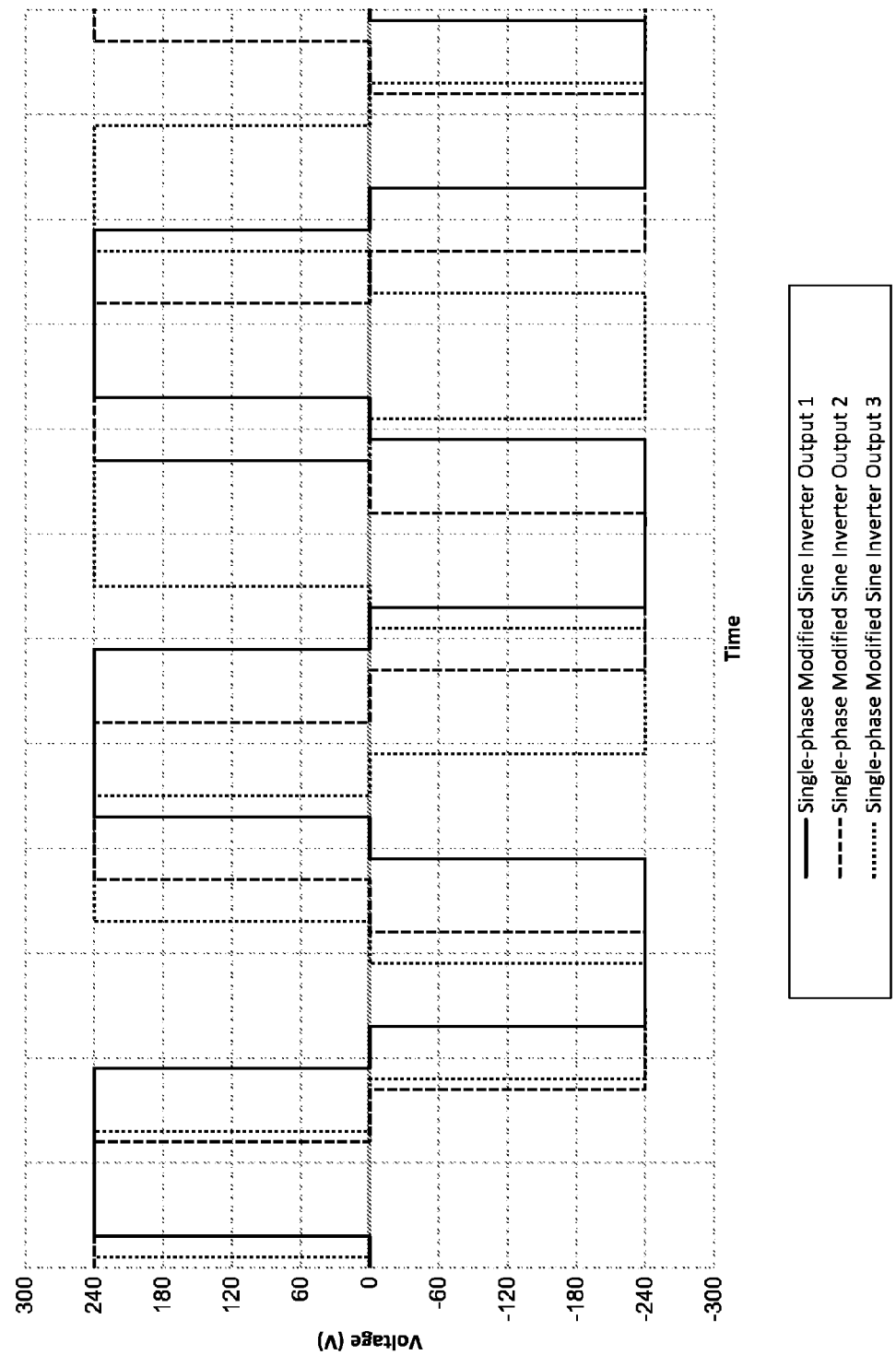
FIG. 4 is a voltage output graph showing three superimposed modified sine AC outputs from three single-phase inverters having staggered phases.
Figure 5:
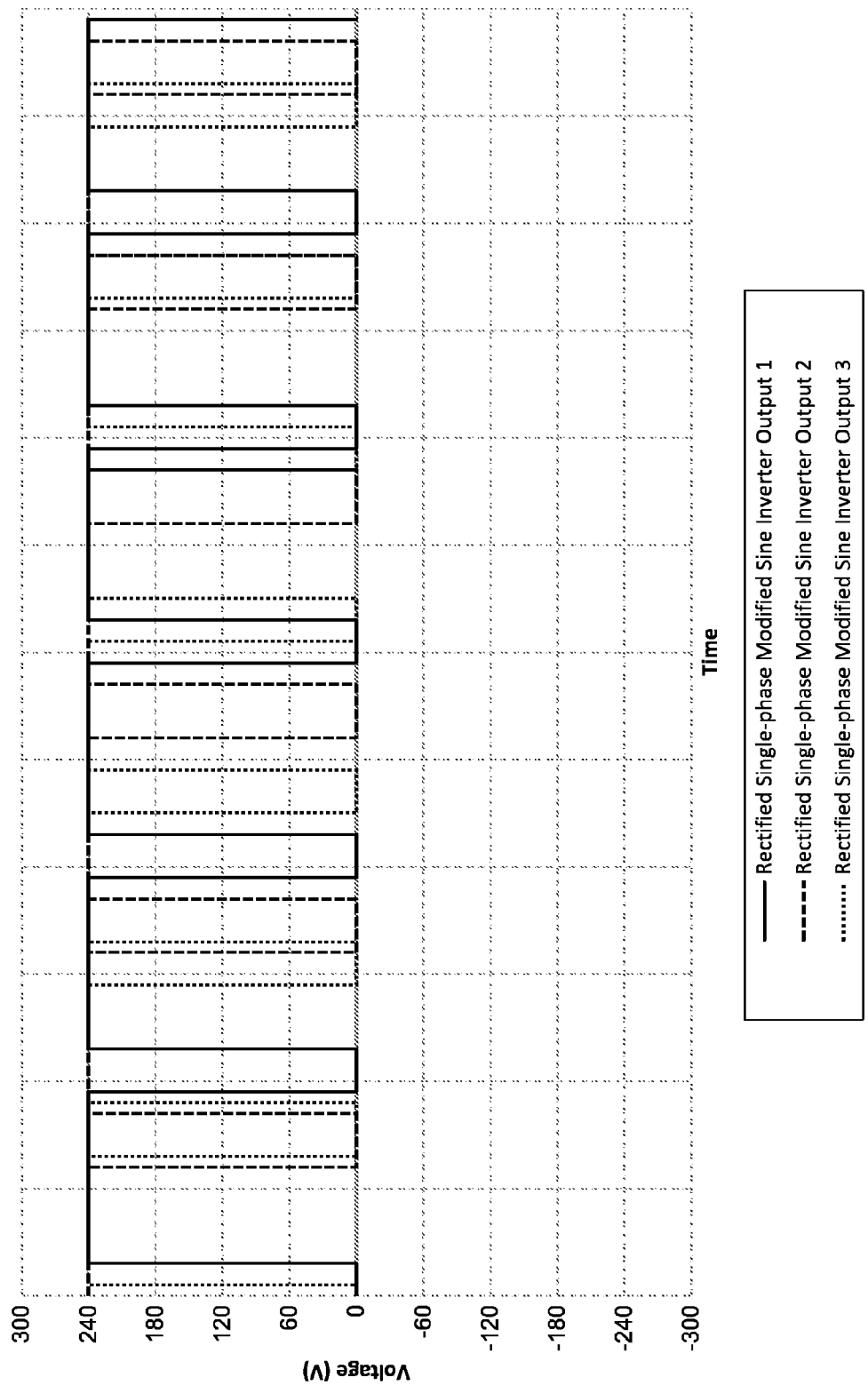
FIG. 5 is a voltage output graph showing three superimposed modified sine AC outputs from three single-phase inverters having staggered phases after they have been rectified.

FIGS. 4 and 5 show three superimposed single-phase modified sine waveforms, showing the final three-phase signal produced by the three single-phase inverters. At all times shown, one of the three phases is at a maximum or minimum (approximately 240 or −240 volts in this embodiment). FIG. 5 displays the signals of FIG. 4 after rectification, showing that the voltage of one of the phases is at the maximum (approximately 240 volts in this embodiment) at all times. In these embodiments the signals depicted in FIG. 4 or 5 are used as the basis for charging the EV via the EVSE. The three single phase signals are delivered to the EVSE three-phase inputs from the single-phase inverters either directly (FIG. 4) or after rectification (FIG. 5). If the signals are not rectified, the EVSE rectifies them. The EVSE uses the consistent high voltage from the three-phase signal it receives to charge the EV using a DC signal. In the embodiments represented by these figures, the three phases have different frequencies or phase offsets, so their peak voltages are not all synchronized. Thus there is no point shown at which all three signals are at zero simultaneously.

The three signals shown in FIGS. 4 and 5 do not have evenly distributed phase offsets, but in other embodiments, the phase of each of the three inverter waveforms may be offset by a fixed amount. When done correctly, this modification helps ensure that there is never a point at which the three phases cross polarity simultaneously. After rectification, this means that the maximum voltage of the three-phase signal is kept consistent, which is ideal for providing power to an EV that expects a particular voltage. In one case, each phase is offset from the others by 120 degrees so at least one of the three rectified phases will always be at a maximum at all times. To do this, the single-phase inverters of the system may have a timing input feature, and the 120 degree offset may be accomplished by feeding the timing from a first single phase inverter to a second single-phase inverter with instructions for the second to start at a 120 degree phase difference, and likewise feeding the timing from the second inverter to a third inverter that starts at a 120 degree offset past the second inverter so that the second inverter lags behind the first inverter by 120 degrees and the third inverter lags behind the second inverter by 120 degrees.

FIG. 6 shows another graph of the three rectified single-phase modified-sine waveforms where only the maximum voltage of the combined phases of the three-phase signal is shown. In this embodiment, brief periods of time are shown wherein all three single-phase outputs of the inverters are at a zero level and/or are crossing polarity. These breaks in the otherwise consistent 240 VDC output may be addressed by the capacitor enhancement previously mentioned. The brevity and rarity of the gaps in voltage provides the information needed to determine the size and type of the capacitor—if the gaps are short and infrequent, an inexpensive, low-capacity capacitor is all that is needed to bridge the gaps and to ensure the DC output never falls below some minimum value. If the gaps are short, but tend to appear frequently a low-ESR (i.e., on the order of approximately one milliohm), low-capacity (i.e., on the order of approximately 100 microfarads) capacitor is used. If the gaps are long but occur relatively infrequently, then a high-capacity (i.e., on the order of approximately 100,000 microfarads), medium-ESR (i.e., on the order of approximately 20 milliohms) capacitor such as an electrolytic may be used. In some embodiments, a combination of different types and sizes of capacitors and other energy storage devices are used when it is most efficient.

Generally speaking, as used herein a "power converter" may refer to a generic electric power converter, inverter, transformer, regulator, voltage stabilizer, rectifier, power supply unit, or other conversion device or combination of these devices that may be used to convert the voltage, frequency, and/or phase of an electrical power source or signal from one form into another form.

As used herein, a "single phase" inverter or converter converts an electrical input signal to a single phase AC output waveform. A "modified-sine" inverter or converter converts an electrical input signal to a single phase AC output waveform that follows an alternating square up-zero-down-zero pattern known to those having skill in the art. A "three-phase" inverter converts an electrical input signal into a three phase AC output waveform.

As used herein, an "energy storage device" is a means for storing energy such as, for example, electrochemical batteries, compressed gas storage, pumped hydro storage, flywheel energy storage, capacitative energy storage, superconductive magnetic energy storage, fuel cell energy storage, combinations thereof, and other similar devices for energy storage known in the art. If the energy storage device includes a battery, the battery types may include rechargeable or non-rechargeable chemistries and compositions, such as, for example, lead-acid, alkaline, secondary lead acid, lithium-ion, sodium (zebra), nickel-metal hydride, nickel cadmium, combinations thereof, and other energy storage chemistries known in the art. Energy storage devices may be comprised of small or large numbers of cells, capacities, voltages, amperages, and other battery properties. They may be configured in unitary or modular designs and may follow standardized guidelines or customized specifications.

In some embodiments the energy storage devices may be integrated with or connected to power management systems, such as those used for peak mitigation, load leveling, or backup or uninterruptible power supplies, since they may conveniently provide the electronic equipment needed to connect an energy storage device to the distribution grid. However, energy storage devices that serve other purposes may be utilized when the necessary connecting equipment is used. Such connecting equipment may comprise power converters for changing voltage signals, inverters for changing AC signals to DC signals (or vice versa), controllers for directing the operation of the power converters, signal conditioning electronics such as stabilizing capacitors, cables, connectors, and other items required to efficiently and safely bring the stored energy to the distribution grid.

Some embodiments use portable energy storage devices for an energy source, and the single-phase inverter apparatus along with the energy source are part of a mobile EV charging system, such as one which is transported by a roadside repair or rescue vehicle. These embodiments may also be configured to be able to connect to an energy source instead of transporting the energy storage devices. In these embodiments, the cost reduction of using single-phase inverters can be particularly useful because an entire fleet of vehicles may be outfitted with three-phase power more economically in this manner than by using expensive all-in-one three phase inverters in each vehicle.

As used herein, "electric vehicle service equipment" (EVSE) refers to electric vehicle chargers, charging equipment such as power converters, cords, plugs, safety features and switches, and other features commonly known in the art of EV charging. As used herein, a "Level 2" or "Level 3" EVSE is a quick-charging vehicle charger with high voltage and/or current as is known colloquially by those skilled in the art.

As used herein, "electric vehicle" or "EV" refers to a vehicle for which an electrical energy storage device (such as, for example, a battery, supercapacitor, capacitor, or fuel cell) is a contributing or primary source of motive power for the vehicle, including, for example, battery electric vehicles (BEVs); gasoline/electric, diesel/electric, or fuel cell/battery hybrid electric vehicles (HEVs); extended range electric vehicles, and plug-in hybrid electric vehicles (PHEVs).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A three phase inverter driver and power conversion system, comprising:
    a three-phase power converter having three-phase AC inputs; and
    three inverters, each of the inverters being configured to produce a modified-sine single-phase AC output, the single-phase AC outputs being connected to the three-phase AC inputs of the power converter such that each of the inverters contributes one phase of a three-phase AC waveform to the power converter, wherein at least one of the phases of the three-phase AC waveform produced for the power converter is offset from at least one of the other phases, wherein the three-phase AC waveform provides a constant voltage due to the phases of the three-phase AC waveform being offset;
    an energy storage device connected in parallel with an output of the power converter and configured to provide power when all three phases of the three-phase AC waveform simultaneously cross polarity.

2. The system of claim 1, wherein the three-phase AC waveform is rectified.

3. The system of claim 1, wherein said three-phase power converter is part of or connected to electric vehicle supply equipment (EVSE).

4. The system of claim 3, wherein the EVSE is connected to a vehicle to provide energy to an energy storage device transported by said vehicle.

5. The system of claim 1, wherein the offset of the phases of the three-phase AC signal is a phase offset of 120 degrees between each phase.

6. The system of claim 1, wherein said inverters receive energy via a bus to which the three inverters are connected in parallel, said bus being connected to one or more energy sources.

7. The system of claim 6, wherein at least one of said energy sources is also used for electrical load leveling or peak electrical demand mitigation.

8. The system of claim 1, wherein the system is transported by a vehicle.

9. A three phase inverter driver and power conversion system, comprising:
    electric vehicle supply equipment (EVSE) having three-phase AC inputs;
    three inverters, at least one of the inverters having a different output frequency from at least one other of the inverters, each of the inverters being configured to produce a single-phase AC output, the single-phase AC outputs being connected to the three-phase AC inputs of the EVSE such that each of the inverters contributes one phase of a three-phase AC waveform to the EVSE; and
    a smoothing energy storage device connected in parallel with output of the EVSE and configured to provide power when all three phases of the three-phase AC waveform simultaneously cross polarity.

10. The system of claim 9, wherein the single-phase AC output of each of said inverters is a modified sine AC waveform.

11. The system of claim 9, wherein the three-phase AC waveform is rectified.

12. The system of claim 9, wherein the differences in output frequency among said inverters are due to manufacturing variance.

13. The system of claim 9, wherein the differences in output frequency among said inverters are due to user settings.

14. The system of claim 9, wherein the single-phase AC outputs of said inverters are offset in phase from each other.

15. The system of claim 9, wherein the three inverters receive energy via a bus to which the three inverters are connected in parallel, said bus being connected to one or more energy sources.

16. The system of claim 15, wherein at least one of said energy sources is also used for electrical load leveling or peak electrical demand mitigation.

17. The system of claim 9, wherein said EVSE is connected to a vehicle to provide energy to an energy storage device transported by said vehicle.

18. The system of claim 9, wherein the system is transported by a vehicle.

19. The system of claim 9, wherein the smoothing energy storage device is at least partially comprised of a capacitor selected from the group consisting of (1) a low-capacity, low-ESR capacitor and (2) a high-capacity, medium-ESR capacitor.

20. A method of supplying a three-phase AC waveform to a set of three-phase inputs of a three-phase power converter, the method comprising:

providing power from an energy source to inputs of three single-phase inverters arranged in parallel;

supplying three single-phase AC outputs of the three single-phase inverters to a set of three-phase inputs of a three-phase power converter, wherein at least one of the single-phase inverters has an output frequency that differs from at least one of the other single-phase inverters due to manufacturing tolerances, and wherein the single-phase inverters are connected to the three-phase power converter such that each of the single-phase inverters contributes a single phase of a three-phase AC waveform to the three-phase power converter;

rectifying the three phases of the three-phase AC waveform; and smoothing the three-phase AC waveform with energy from an energy storage device positioned in parallel to an output of the three-phase AC waveform, wherein the smoothing is provided at times when all three phases of the output of the three-phase AC waveform simultaneously change polarity.

21. The method of claim 20, further comprising connecting said power converter to an energy storage device transported by a vehicle.

22. The method of claim 20, wherein said energy storage device is at least partially comprised of a capacitor selected from the group consisting of (1) a low-capacity, low-ESR capacitor and (2) a high-capacity, medium-ESR capacitor.

* * * * *